(12) United States Patent
Tuch et al.

(10) Patent No.: US 10,255,090 B2
(45) Date of Patent: Apr. 9, 2019

(54) HYPERVISOR CONTEXT SWITCHING USING A REDIRECTION EXCEPTION VECTOR IN PROCESSORS HAVING MORE THAN TWO HIERARCHICAL PRIVILEGE LEVELS

(71) Applicant: VMware, Inc., Palo Alto, CA (US)

(72) Inventors: Harvey Tuch, Cambridge, MA (US); Andrei Warkentin, Wakefield, MA (US)

(73) Assignee: VMware, Inc., Palo Alto, CA (US)

( * ) Notice: Subject to any disclaimer, the term of this patent is extended or adjusted under 35 U.S.C. 154(b) by 10 days.

(21) Appl. No.: 14/312,207

(22) Filed: Jun. 23, 2014

(65) Prior Publication Data

US 2015/0370591 A1    Dec. 24, 2015

(51) Int. Cl.
*G06F 9/455*    (2018.01)

(52) U.S. Cl.
CPC ............... *G06F 9/45558* (2013.01); *G06F 2009/45587* (2013.01); *G06F 2009/45591* (2013.01)

(58) Field of Classification Search
CPC .................. G06F 9/45558; G06F 9/45533
USPC .......................................................... 718/1
See application file for complete search history.

(56) References Cited

U.S. PATENT DOCUMENTS

| | | | |
|---|---|---|---|
| 6,496,847 B1 | 12/2002 | Bugnion et al. | |
| 7,278,030 B1 | 10/2007 | Chen et al. | |
| 7,757,231 B2 | 7/2010 | Anderson et al. | |
| 7,865,893 B1 | 1/2011 | Omelyanchuk et al. | |
| 8,091,086 B1 * | 1/2012 | Ershov ................. | G06F 9/5077 718/1 |
| 8,127,292 B1 * | 2/2012 | Dobrovolskiy ..... | G06F 9/45541 717/174 |
| 8,245,227 B2 | 8/2012 | Devine et al. | |
| 8,479,195 B2 | 7/2013 | Adams et al. | |
| 8,826,273 B1 | 9/2014 | Chen | |
| 10,002,084 B1 | 6/2018 | Warkentin et al. | |
| 2006/0150183 A1 | 7/2006 | Chinya et al. | |
| 2006/0224816 A1 | 10/2006 | Yamada et al. | |
| 2009/0006714 A1 | 1/2009 | Durham et al. | |

(Continued)

OTHER PUBLICATIONS

"Chapman et al";"vNUMA: Virtual Shared-Memory Multiprocessors";"2008";"209 pages".*

(Continued)

*Primary Examiner* — Wei Zhen
*Assistant Examiner* — Brahim Bourzik
(74) *Attorney, Agent, or Firm* — Patterson + Sheridan, LLP

(57) ABSTRACT

In a virtualized computer system operable in more than two hierarchical privilege levels, components of a hypervisor, which include a virtual machine kernel and virtual machine monitors (VMMs), are assigned to different privilege levels. The virtual machine kernel operates at a low privilege level to be able to exploit certain features provided by the low privilege level, and the VMMs operate at a high privilege level to support execution of virtual machines. Upon determining that a context switch from the virtual machine kernel to a VMM is to be performed, the computer system exits the low privilege level, and enters the high privilege level to execute a trampoline that supports context switches to VMMs, such as state changes, and then the VMM. The trampoline is deactivated after execution control is switched to the VMM.

19 Claims, 9 Drawing Sheets

(56) References Cited

U.S. PATENT DOCUMENTS

| | | | |
|---|---|---|---|
| 2009/0113110 A1* | 4/2009 | Chen | G06F 9/4426 711/6 |
| 2009/0300263 A1 | 12/2009 | Devine et al. | |
| 2011/0078361 A1 | 3/2011 | Chen et al. | |
| 2011/0179413 A1 | 7/2011 | Subramanian et al. | |
| 2012/0079458 A1* | 3/2012 | Williams | G06F 9/30189 717/124 |

OTHER PUBLICATIONS

"Wu et al";"Towards Mandatory Security Monitoring in Virtualized Datacenter Environment";"2013";"12 pages" (Year: 2013).*

Chen et al., "Overshadow: Avirtualization-Based Approach to Retrofitting Protection in Commodity Operating Systems" Mar. 2008 12 pages.

Hwang et al., "Xen on ARM: System Virtualization using Xen Hypervisor for ARM-Based Secure Mobile Phones", 5 pages, 2008.

Vahidi et al., "Virtualizing the Trusted Execution Environment" 35 pages, Mar. 2013.

Chapman et al., "vNUMA: Virtual Shared-Memory Multiprocessores", "2008";"209 pages".

* cited by examiner

HYPERVISOR CONTEXT SWITCHING USING A REDIRECTION EXCEPTION VECTOR IN PROCESSORS HAVING MORE THAN TWO HIERARCHICAL PRIVILEGE LEVELS

CROSS-REFERENCE TO RELATED APPLICATION(S)

This application is related to the patent application entitled "Hypervisor Context Switching Using a Trampoline Scheme in Processors Having More Than Two Hierarchical Privilege Levels" Ser. No. 14/312,175 and the patent application entitled "Hypervisor Context Switching Using TLB Tags in Processors Having More Than Two Hierarchical Privilege Levels" Ser. No. 14/312,225, both of which are assigned to the assignee of this application and have been filed on the same day as this application.

BACKGROUND

Hypervisors support execution of virtual machines running in computer systems and have multiple components (e.g., virtual machines, user worlds, virtual machine kernel, etc.) that share resources of the computer systems. Hypervisors are tailored to optimize the usage of the resources of the computer systems while complying with restrictions of the computer systems.

As part of transitioning execution control from one component to another, the hypervisor performs a context switch—storing and restoring component-specific state, such as memory and processor state. Context switches have a performance impact on a system that requires careful optimization and mitigation. Consequently, efficiently managing page tables, exception vectors (i.e., fixed memory addresses to which execution is directed in response to interrupts and other processor exceptions events), address space identifiers (ASID), and/or virtual machine identifiers (VMID) to optimize context switches across various hypervisor components noticeably improves the performance of the virtual machines and user worlds.

The implementation and accessibility of features, such as ASIDs, that each hypervisor component may leverage to streamline context switches varies based on the hardware architecture. Further, some hardware architectures provide multiple hierarchical privilege levels that each provide a different set of performance and resource tradeoffs and constraints for the components executing at the privilege level. Examples of such hardware architectures are the ARM®v7 and ARM®v8 (Instruction Set Architecture versions 7 and 8) hardware architectures, which are commercially available from ARM Holdings of Cambridge, United Kingdom. To perform efficient context switches in architectures with multiple hierarchical privilege levels, a strategy that judiciously assigns and manages the hypervisor components across the privilege levels is desirable.

SUMMARY

One or more embodiments provide techniques to perform context switches between hypervisor components in a virtualized computer system operable in more than two hierarchical privilege levels. According to the embodiments, each component of the hypervisor is individually assigned to a privilege level, and techniques are provided to enable execution control to switch between the components.

A method of executing a context switch between hypervisor components across privilege levels in a computer system operable in more than two hierarchical privilege levels, according to an embodiment, includes the steps of assigning a first component of a hypervisor to a first privilege level and a second component of the hypervisor to a second privilege level, where the second privilege level is more privileged than the first privilege level; activating a trampoline at the second privilege level, where the trampoline is configured to support context switches to the second component; executing the first component at the first privilege level; determining that a first context switch from the first privilege level to the second privilege level is to be performed and in response, executing the trampoline at the second privilege level; and deactivating the trampoline and executing the second component at the second privilege level.

A method of efficiently performing context switches between a hypervisor kernel and a virtual machine monitor in a computer system operable in more than two hierarchical privilege levels, according to an embodiment, includes the steps of configuring the computer system to tag entries of a translation lookaside buffer with virtual machine identifiers; executing a hypervisor kernel at the first privilege level; initiating a first context switch to a first virtual machine monitor to be executed at a second privilege level; determining whether to invalidate the entries in the translation lookaside buffer based on one or more of the virtual machine identifiers; performing one or more context switching operations at the second privilege level; and executing the first virtual machine monitor at the second privilege level.

A method of executing a context switch between hypervisor components in a computer system operable in more than two hierarchical privilege levels, according to an embodiment, includes the steps of assigning a first component and a second component of a hypervisor to a first privilege level; setting a redirection exception vector at an second privilege level that is less privileged than the first privilege level; causing the first component to run one or more commands at a third privilege level that is less privileged than the second privilege level; while the first component is running one or more commands at the third privilege level, determining that a first context switch is to be performed from the first component to the second component and in response, exiting the third privilege level and entering the second privilege level; in response to exiting the third privilege level, bouncing from the second privilege level to the first privilege level based on the redirection exception vector; configuring a state associated with the first privilege level; and executing the second component at the first privilege level.

In the embodiments, comprehensive techniques for hypervisor context switching capitalize on the privilege levels provided by the hardware architecture and enable efficient execution of virtual machines. By assigning each component of the hypervisor a privilege level and providing mechanisms to streamline the operation of the hypervisor within and across components, performance may be fine-tuned based on performance and resource requirements. Notably, context switching between hypervisor components is optimized to reuse content, such as page tables, and reduce time-consuming operations, such as translation lookaside buffer flushes, thereby improving the overall efficiency of the computer system.

DETAILED DESCRIPTION

Figure 1:
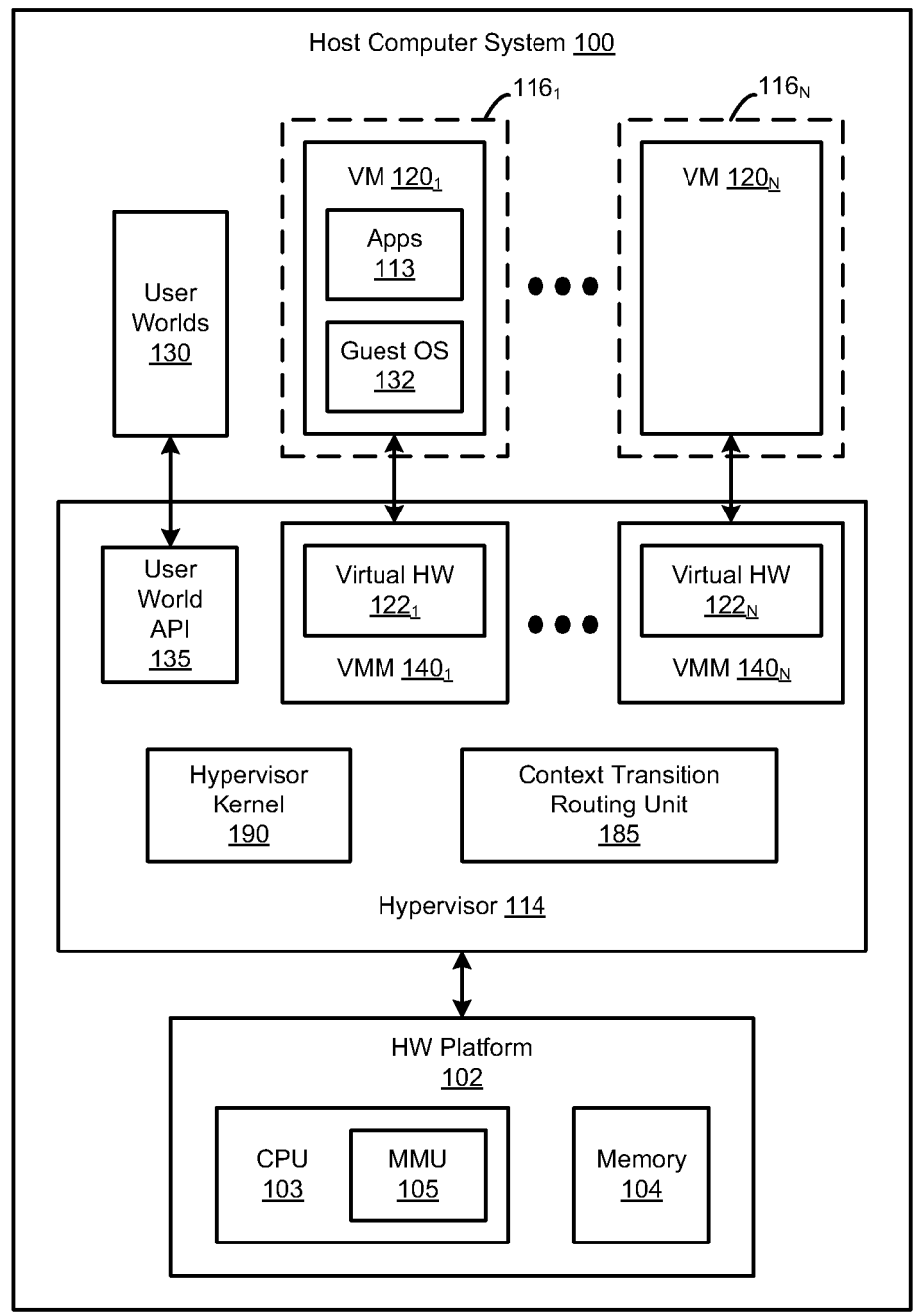
FIG. 1 is a block diagram of a virtualized computer system that is configured to perform context switches between hypervisor components, according to one or more embodiments.

FIG. 1 is a block diagram of a virtualized computer system that is configured to perform context switches between hypervisor components, according to one or more embodiments. Host computer system 100 may be constructed on a desktop, laptop, mobile, tablet or server grade hardware platform 102. Hardware platform 102 includes one or more central processing units (CPU) 103, host physical memory 104, and other standard hardware components such as network interface controllers (not shown) that connect host computer system 100 to a network.

A hypervisor 114 is installed on top of hardware platform 102. Hypervisor 114 includes, inter alia, a hypervisor kernel 190, virtual machine monitors (VMM) $140_1$-$140_N$, a user world application interface (API) 135, and a context transition routing unit 185. In alternate embodiments, hypervisor 114 may include any number of components and the functionality implemented in hypervisor kernel 190, VMMs 140, user world API 135, and context transition routing unit 185 may be distributed in any technically feasible manner between the hypervisor components.

Hypervisor kernel 190 provides operating system functionality (e.g., process creation and control, file system, process threads, etc.) as well as CPU scheduling and memory scheduling across multiple virtual machine (VM) execution spaces $116_1$-$116_N$ and multiple user worlds 130 within hypervisor 114. Within each VM execution space $116_1$-$116_N$, a VM process is executed to instantiate corresponding VMs $120_1$-$120_N$, and virtual machine monitors (VMM) $140_1$-$140_N$ implement the virtual system support needed to coordinate operations between hypervisor 114 and their respective VMs $120_1$-$120_N$. As shown, each VMM $140_1$-$140_N$ manages a corresponding virtual hardware platform (i.e., virtual hardware platforms $122_1$-$122_N$) that includes emulated hardware such as virtual CPUs (vCPUs) and guest physical memory. Each virtual hardware platform 122 supports the installation of a guest operating system (OS) (e.g., guest OS 132). In each instance, the guest OS provides user-level applications running in the virtual machine, such as application (apps) 113, an interface to the virtual hardware platform of the virtual machine.

User world API 135 implements an interface for user worlds 130 to execute "native" hypervisor kernel processes that run within hypervisor 114. User worlds 130 provides a framework that enable processes, such as a direct console user interface, to run in the environment provided by hypervisor 114 but outside VMs 120. In some embodiments, each VMM $140_1$-$140_N$ is paired with a corresponding VM executable process, known as a VMX process, which executes within user world 130. VM requests, such as communication with user interfaces, may be passed from VMM 140 to the corresponding VMX. In some embodiments, each VMM may be created by, entered into, and exited via the paired VMX. For explanatory purposes only, transitions to and from VMXs are not explicitly described herein but are encompassed within other transitions, such as a composite transition from hypervisor kernel 190 to VMM 140.

It should be recognized that the various terms, layers and categorizations used to describe the virtualization components in FIG. 1 may be referred to differently without departing from their functionality or the spirit or scope of the invention. For example, virtual hardware platforms $122_1$-$122_N$ may be considered to be part of virtual machine monitors (VMM) $140_1$-$140_N$. Alternatively, virtual hardware platforms $122_1$-$122_N$ may be considered to be separate (e.g., as a component of its corresponding virtual machine since such platforms include the hardware emulation components for the virtual machine) from VMMs $140_1$-$140_N$, and VMMs $140_1$-$140_N$ may be considered to be separate from hypervisor 114. One example of hypervisor 114 that may be used is included as a component of VMware's vSphere® product, which is commercially available from VMware, Inc. of Palo Alto, Calif. It should further be recognized that other virtualized computer systems are contemplated, such as hosted virtual machine systems, where the hypervisor is implemented in conjunction with a host operating system.

In operation, CPU 103 executes software at different privilege levels, where each privilege level imposes a set of constraints and provides a set of functionality (such as access to specific registers and address translation mechanisms). For example, user applications typically execute at a relatively low privilege level that precludes processes from executing instructions that could damage or compromise host computer system 100. In the embodiment illustrated in FIG. 1, hardware platform 102 supports four hierarchical privilege levels and an exception mechanism for transitioning execution between these privilege levels. It should be understood that, hardware platforms of other embodiments may support less than or more than four hierarchical privilege levels. From least to most privileged, the privilege levels are: exception level 0 (EL0), EL1, EL2, and EL3. On taking an exception, the privilege level either increases or remains the same. By contrast, on returning from an exception, the privilege level either decreases or remains the same. Hardware platform 102 supports a variety of types of exceptions that may differ in semantics and nomenclature.

Some types of exceptions are referred to as "system calls," "interrupts," "hypercalls," and "faults."

An exemplary host computer system 100 that provides the described hierarchical privilege levels includes an ARM@Cortex-A57 (based on the ARM®v8 architecture) CPU 103. The ARM@Cortex-A57 is commercially available from ARM Holdings of Cambridge, United Kingdom. It should be recognized that the techniques described herein are illustrative rather than restrictive. In particular, alternate embodiments include any CPU 103 that supports more than two hierarchical privilege levels that may be leveraged in a similar fashion to the disclosed techniques.

The influence of the privilege levels extends beyond the CPU 103 to the other components of hardware platform 102. For instance, memory management unit (MMU) 105 may carry out the mappings from a virtual address space of VMs $120_1$-$120_N$ or any other applications running on hypervisor 114 to a physical address space of memory 104 (referred to herein as the "host physical address space") using either a translation lookaside buffer (TLB) or page tables stored in memory 104. At privilege levels EL0 and EL1, hardware platform 102 provides support for TLB "tags" that specify data such as address space identifiers (ASID) and virtual machine identifiers (VMID). These tags enable the TLB to cache entries for multiple address spaces simultaneously without compromising the integrity of the independent address spaces. Some embodiments leverage these tags to reduce "flushing" of cached entries in the TLB, thereby optimizing the performance of processes executing on CPU 103.

To both comply with the restrictions and fully exploit the functionality of different privilege levels, various components within hypervisor 114 are assigned to different privilege levels. For example, VMMs 140 are assigned to a relatively high privilege level that provides virtualization functionality. As CPU 103 executes, control transfers from one hypervisor component to another. Hypervisor 114 configures impacted components to issue, handle, and/or return from exceptions in addition to performing context switching operations, such as storing/restoring memory space and processor state. To reduce the overhead associated with context switching, hypervisor 114 implements a comprehensive strategy that capitalizes on the privilege levels provided by the hardware platform 102. As part of this strategy, hypervisor components are sagaciously assigned to privilege levels, and context transition routing unit 185 is configured to support and optimize context switches between various hypervisor components.

Figure 2:
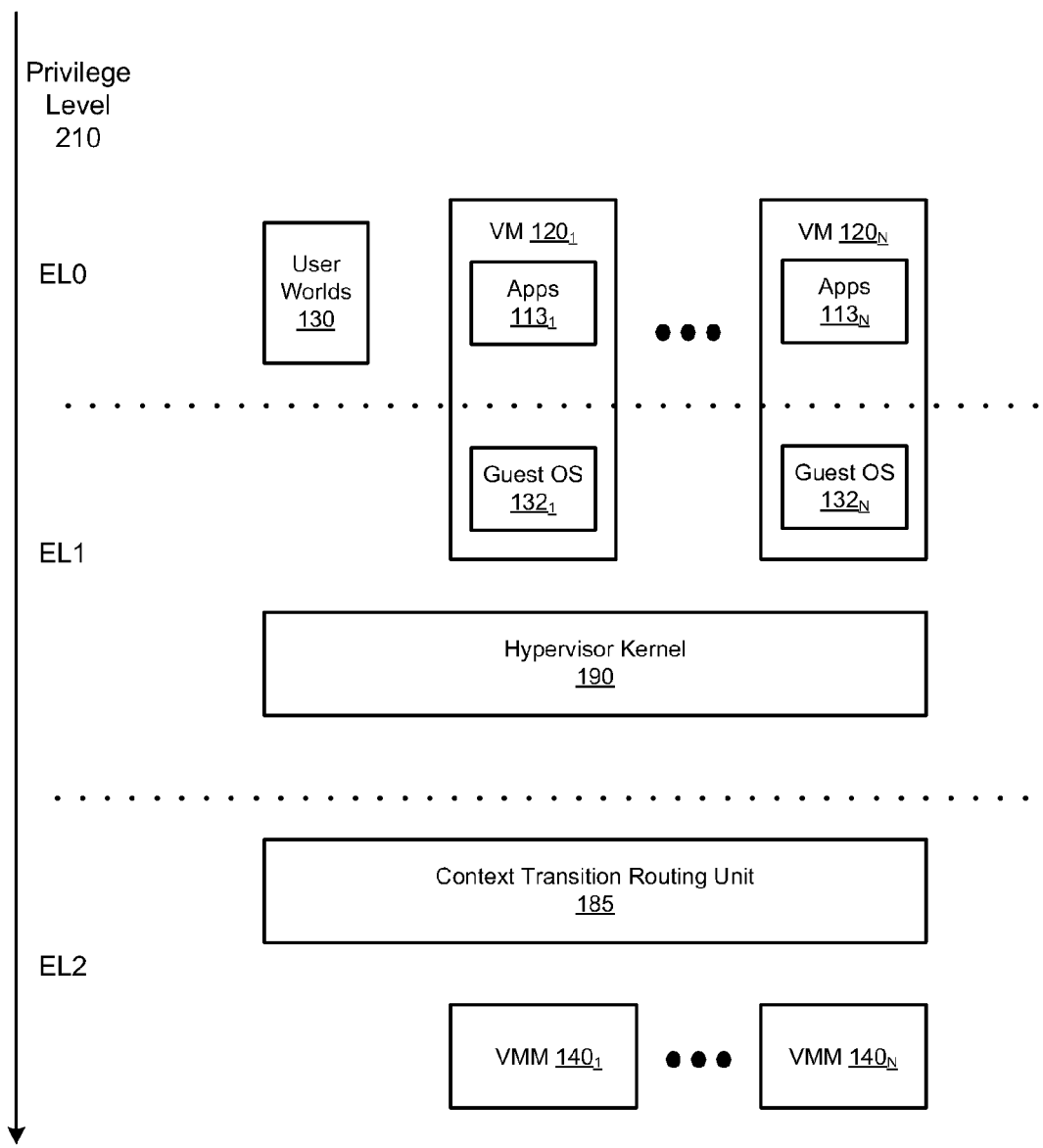
FIG. 2 is a conceptual diagram that illustrates assignment of privilege levels to hypervisor components, according to one or more embodiments.

FIG. 2 is a conceptual diagram that illustrates assignment of privilege levels 210 to hypervisor components, according to one or more embodiments. As shown, privilege levels 210 include a low privilege level EL0, an intermediate privilege level EL1, and a high privilege level EL2. Although not shown, privilege levels 210 also include a fourth privilege level—a highest privilege level that is usually reserved for secure applications. Processes within user worlds 130 and applications 113 within VMs 120 execute at EL0. Guest OS 132 and hypervisor kernel 190 execute at EL1, because they require functionality beyond the scope of EL0. VMMs 140 leverage virtualization functionality (i.e., virtualization extension features) provided at EL2 and unavailable at lower privilege levels and, accordingly, execute at EL2.

Context switches between hypervisor kernel 190 and VMMs 140 involve manipulating shared state at EL2. In particular, before selected VMM 140 begins executing, a translation table base register (TTBR) included in an EL2 shared state is set to point to the pages tables of selected VMM 140. Since hypervisor kernel 190 is assigned to EL1, hypervisor kernel 190 cannot modify the TTBR included in EL2 shared state. To facilitate such highly-privileged operations, context translation routing unit 185 is assigned to EL2 and is configured to gate entrance and exit to EL2 during context transitions that involve VMMs 140.

It should be recognized that assigning hypervisor kernel 190 to EL1 allows hypervisor kernel 190 to exploit characteristics of EL1 that are not included in EL2. For example, EL1 includes features, such as ASIDs, that supports a multiple address space userland. In another example, hypervisor 114 may be configured to emulate non-maskable interrupts (NMIs) by taking all interrupts at EL2 and then selectively injecting into hypervisor kernel 190 using virtual fast interrupts (FIQs).

Figure 3A:
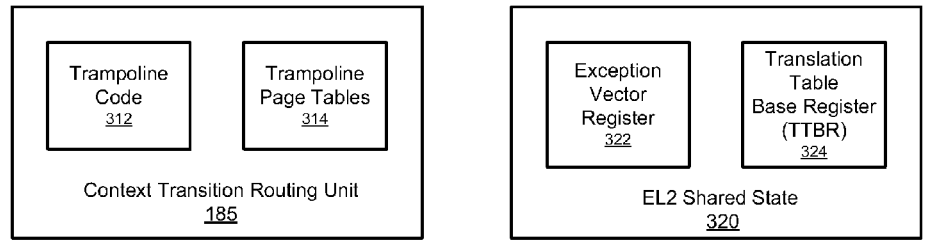
FIGS. 3A, 3B and 3C are conceptual diagrams that illustrate a trampoline scheme employed to perform context switches between virtual machine kernel and virtual machine monitor, according to one or more embodiments.
Figure 3B:
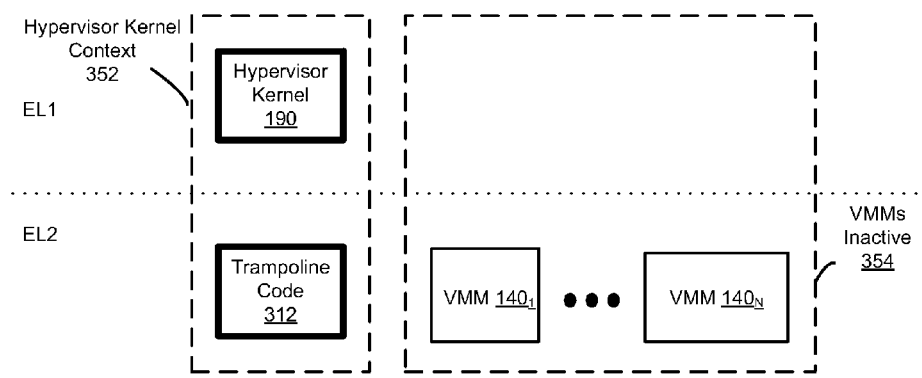
Figure 3C:
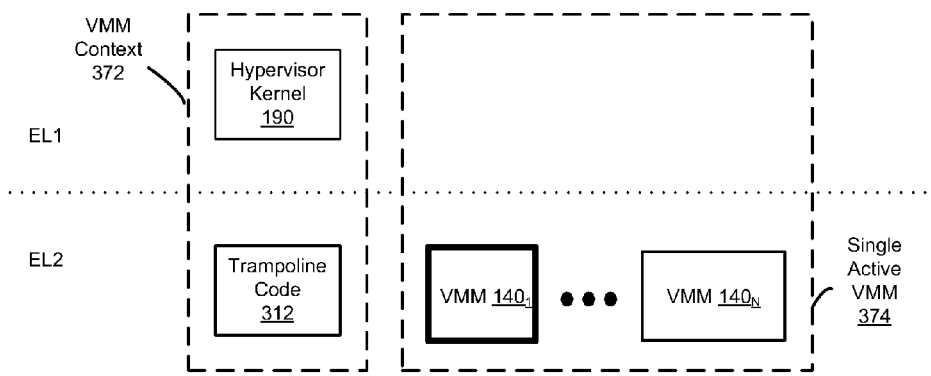

FIGS. 3A, 3B and 3C are conceptual diagrams that illustrate a trampoline scheme employed to perform context switches between hypervisor kernel 190 and virtual machine monitor (VMM) 140, according to one or more embodiments. Generally, in computer programming, a trampoline is a short piece of code that redirects execution flow to another piece of code. In operation, context transition routing unit 185 intercepts transitions to and from EL2 targeted to VMMs 140—providing a trampoline between a hypervisor kernel context 352 in which hypervisor kernel 190 controls execution and a VMM context 372 in which selected VMM 140 controls execution Context transition routing unit 185 includes trampoline code 312 and trampoline page tables 314, and is configured to collaborate with VMMs 140 to modify EL2 shared state 320. EL2 shared state 320 encapsulates certain state information, including exception vector register 322 and translation table base register (TTBR) 324, that impacts context switching between hypervisor kernel 190 and VMMs 120, but is inaccessible at privilege levels lower than EL2.

As CPU 103 executes, EL2 shared state 320 indicates whether hardware platform 102 is operating in hypervisor kernel context 352 or VMM context 372. Depending on the context, different hypervisor components are active at the various privilege levels. FIGS. 3B and 3C delineate hypervisor components that are active, respectively, in hypervisor kernel context 352 and VMM context 372 with thick bordered boxes. Notably, hypervisor 114 time-shares activation/execution at EL2 between trampoline code 312 and VMMs 140.

In hypervisor kernel context 352, hypervisor kernel 190 is active at EL1 and trampoline code 312 is active at EL2. While hypervisor kernel 190 executes at EL1, configurable virtualization exits to EL2 and nested paging are disabled and an idempotent mapping (i.e., applying the same mapping a second time to an address gives the same result as applying the mapping once to the address) between physical addresses and machine addresses exists for hypervisor kernel 190 and user worlds 130. Notably, upon entry to EL2, EL2 shared state 320 causes CPU 103 to execute trampoline code 312. Executing trampoline code 312 initiates the transfer of execution control to VMM 140. VMM 140 completes the transition to VMM context 372, inactivates trampoline code 312 via EL2 shared state 320, and executes. During VMM context 372, a single active VMM 374 controls execution flow—other VMMs 140 are inactive. Subsequently, as part of transferring execution from VMM 140 back to hypervisor kernel 190, VMM 140 configures EL2 shared state 320 to re-activate trampoline code 312, thereby enabling future context transitions to VMM context 352 via the trampoline scheme.

Figure 4:
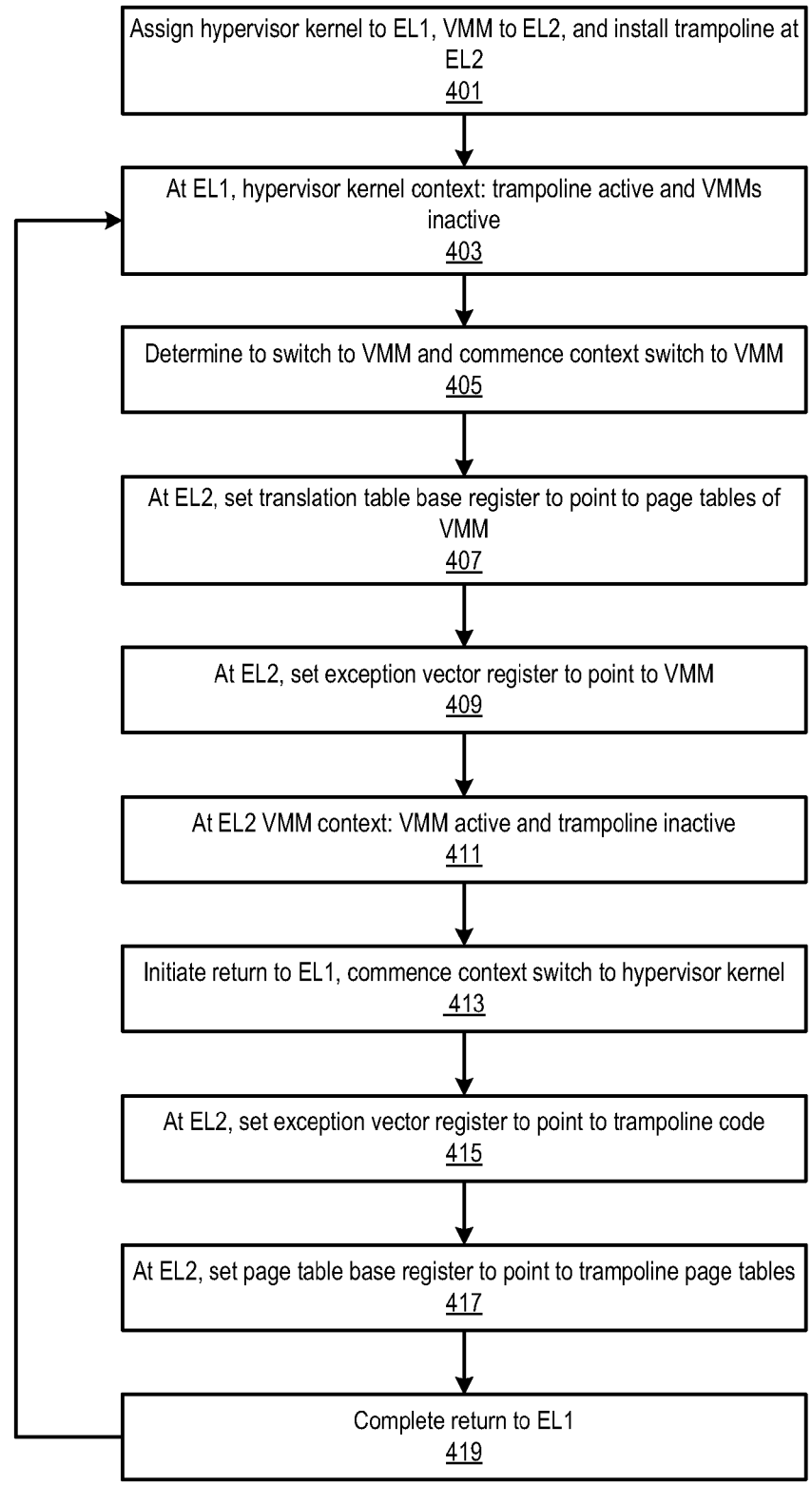
FIG. 4 depicts a flow diagram of a method that employs a trampoline scheme to facilitate context switches between hypervisor components assigned to different privilege levels, according to one or more embodiments.

FIG. 4 depicts a flow diagram of a method that employs a trampoline scheme to facilitate context switches between hypervisor components assigned to different privilege levels 210, according to one or more embodiments. As shown, this method begins at step 401, where CPU 103 starts (i.e., boots, initiates after reset, powers-up, etc.), and early hypervisor boot stages install and configure components included in hypervisor 114. Early hypervisor boot stages and the installation of components included in hypervisor 114 may be implemented in any technically feasible fashion. In some embodiments, early hypervisor boot stages are implemented within a component in hypervisor 114. Further, in some embodiments, early hypervisor boot stages comply with a unified extensible firmware interface (UEFI).

As part of step 401, early hypervisor boot stages assign VMMs 140 and context transition routing unit 185 (including trampoline code 312) to EL2 and assigns hypervisor kernel 190 to EL1. In addition, early hypervisor boot stages establish trampoline page tables 314 and reserve a permanent vector that points to the address of trampoline code 312. To streamline execution switches, context transition routing unit 185 does not store any state information. In some embodiments, early hypervisor boot stages disable nested page table translation and configurable virtualizations exits to EL2, enabling hypervisor kernel 190 to directly access memory 104 without intermediate address translations from virtual addresses to machine addresses.

At step 403, hypervisor kernel 190 operates in hypervisor kernel context 352—executing at EL1 and scheduling user worlds 130 to execute at EL0. In general, hypervisor kernel 190 may provide a variety of operating system functionality (e.g. resource scheduling, managing device drivers, etc.). While in hypervisor kernel context 352, EL2 shared state 320 reflects "active" trampoline code 312 and "inactive" VMMs 140. In general, EL2 shared state 320 enforces time-sharing between trampoline code 312 and VMMs 140.

At step 405, hypervisor kernel 190 elects to switch execution to a particular VMM 140 and, consequently, commences a context switch to VMM context 372. The scheduler within hypervisor kernel 190 may determine to switch execution for any number of reasons, such as requests from user worlds 130, requests from VMMs 140, or a resource sharing heuristic. To enable VMM 140 to execute at the assigned privilege level 210 of EL2 while complying with the hierarchical arrangement of privilege levels 210, hypervisor kernel 190 causes execution to exit EL1 and then enter EL2.

To enter EL2, hypervisor kernel 190 invokes a function and includes a parameter indicating the translation table base register (TTBR) of scheduled VMM 140, thereby selecting a single VMM 140 and excluding any number of other VMMs 140. In alternate embodiments, exit from EL1, entry into EL2, and communication of selected VMMs 140 may occur in any technically feasible fashion. In general, hardware platform 102 supports privilege level execution transitions via exceptions—each privilege level is entered via an exception call and exited via an exception return. However, the implementation and framework of the exception call process may vary in different embodiments and across different privilege levels.

Upon entry to EL2, exception vector register 322 causes execution to branch to trampoline code 312, and translation table base register 324 ensures the address space of EL2 reflects trampoline page tables 314. At step 407, trampoline code 312 executes at EL2, setting translation table base registers 324 to the page tables of VMM 140 and transferring execution control to VMM 140. As part of the transition, trampoline code 312 may flush the EL2 translation lookaside buffer to ensure the integrity of the EL2 address space. Notably, to reduce the complexity of trampoline code 312, trampoline code 312 defers as many of the context switching operations as possible to VMM 140. In alternate embodiments, trampoline code 312 may be configured to perform additional context switching operations, such as setting exception vector register 322 prior to transferring execution control to scheduled VMM 140.

At step 409, VMM 140 sets exception vector register 322 to point to VMM 140, thereby deactivating trampoline code 312. VMM 140 also completes the process of switching to VMM context 372. In particular, VMM 140 stores relevant EL0-EL2 state that hypervisor kernel 190 and trampoline code 312 have not stored and replaces current EL2 state with an EL2 state maintained by VMM 140. Since VMM 140 controls the EL2 state and execution flow, VMM 140 is considered "active" (step 411). By contrast, other VMMs 140 and trampoline code 312 are considered "inactive" and do not affect execution flow during the current VMM context 372.

VMM 140 executes VM 120 at EL2, guest OS 132 at EL1, and applications 113 at EL0 until VMM 140 receives a request, such as an interrupt, to return execution control flow to hypervisor kernel 190 (step 413). At step 415, VMM 140 restores the EL0-EL2 state that VMM 140 previously stored and replaced. In particular, VMM 140 overwrites exception vector register 322 with the address of trampoline code 312 (step 415) and replaces the translation table base register 324 with the trampoline page tables 314 (step 417) prior to exiting EL2.

In one embodiment, trampoline page tables 314 are mapped in both the address space of the context transition routing unit 310 as well as the address space of scheduled VMM 140 to avoid pipeline races. In such an embodiment, scheduled VMM 140 executes a given "continuation" function to reinstate the translation table base register 324 with the trampoline page tables 314 when exiting EL2.

At step 419, scheduled VMM 140 exits EL2—completing the return to hypervisor kernel context 352. This method then returns to step 403 where, upon entry to EL1, hypervisor kernel 190 controls the execution flow at EL1 and EL0, and trampoline code 312 is active at EL2. The hypervisor 114 continues to execute steps 403-419, scheduling hypervisor kernel 190 and VMMs 140 to share the resources of hardware platform 102.

Figures 5A, 5B:
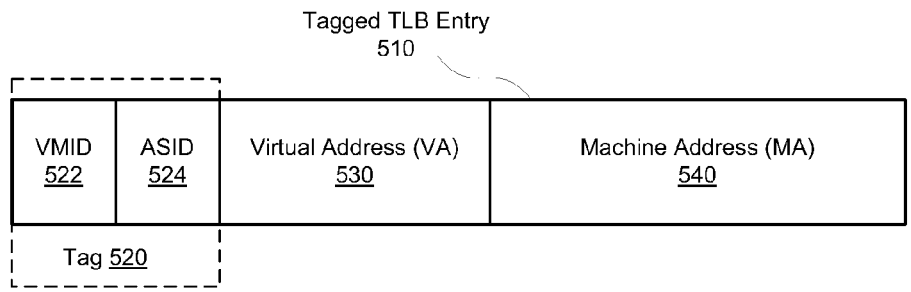
FIGS. 5A and 5B are conceptual diagrams that illustrated a tagged translation lookaside buffer and a tagged address space, according to one embodiment.

FIGS. 5A and 5B are conceptual diagrams that illustrate a tagged translation lookaside buffer entry 510 and a tagged EL0/EL1 address space 550, according to one embodiment. In operation, hardware platform 102 provides a shared EL0/EL1 address space at EL0 and EL1, and an EL2 address space at EL2. Each address space has a different set of features. Among other differences, shared EL0/EL1 address space supports tagged TLB entry 510, while EL2 address space does not.

As shown, tagged TLB entry 510 includes, inter alia, a virtual address (VA) 530, a machine address (MA) 540, and a tag 520. Tag 520 includes a virtual machine identifier (VMID) 522 and an address space identifier (ASID) 524. At EL0 and EL1, hardware platform 102 is configured to perform a TLB matching process that incorporates the tags 520 into translations from VAs 530 to MAs 540. This TLB matching process enables multiple distinct address spaces within tagged EL0/EL1 address space 550 and, consequently, may reduce the number of time-consuming TLB flushes required during context switches.

As part of optimizing context switches, hypervisor 114 assigns different VMIDs 522 to hypervisor kernel 190 and VMMs 140. Further, hypervisor 114 assigns different ASIDs 524 to each user world 130. Although a reserved VMID for hypervisor kernel 555 is shown as 0 in FIG. 5B, hypervisor 114 may assign any number (including 0) of VMIDs 522 and/or ASIDs 524 to any number of hypervisor components and/or processes that executes within hardware platform 104. As shown in FIG. 5B, each different combination of VMID 522 and ASID 524 represents a separate EL0/EL1 address space 560 within tagged EL0/EL1 address space 550.

Figure 6:
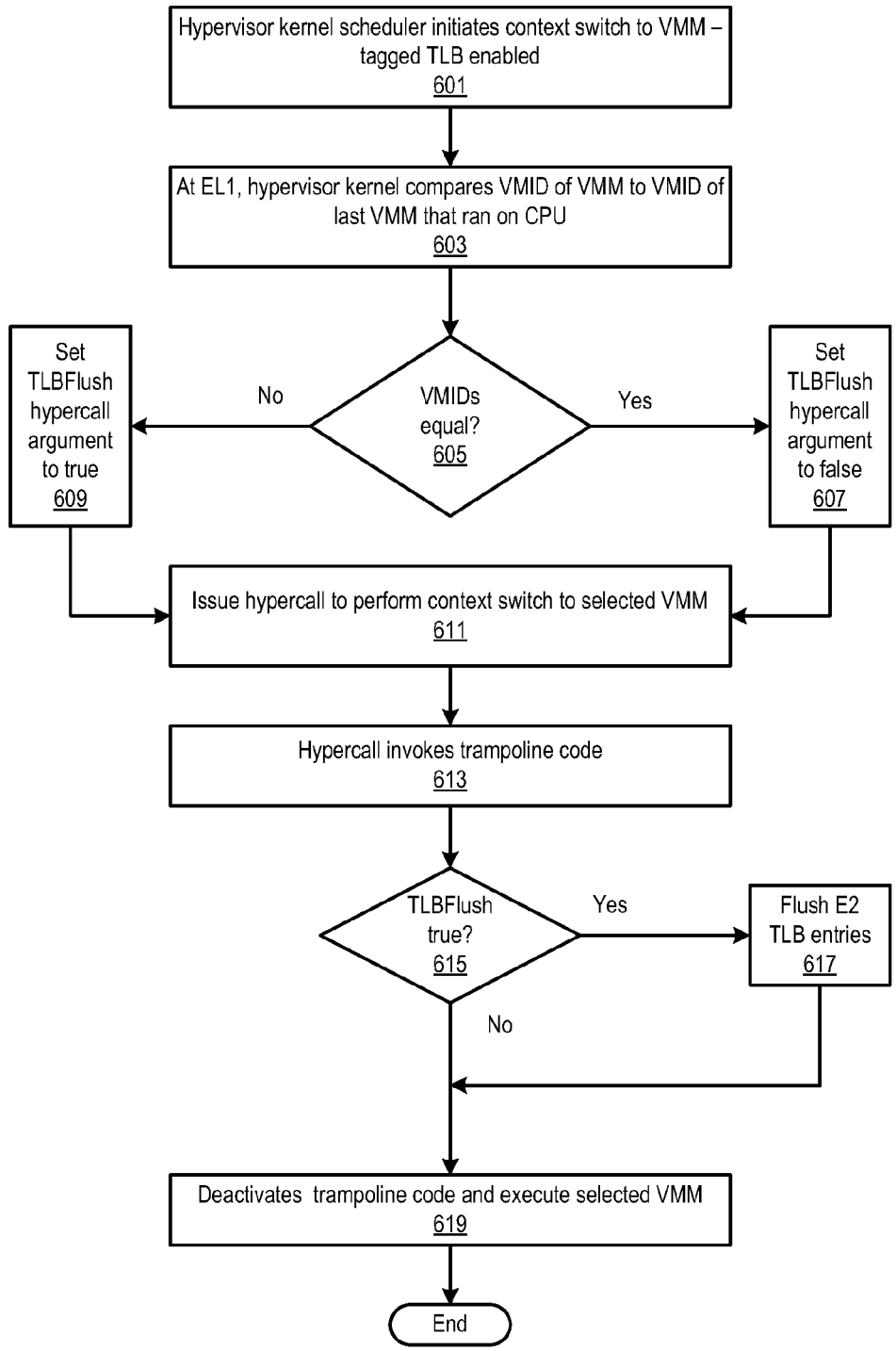
FIG. 6 depicts a flow diagram of a method for optimizing context switches between hypervisor components assigned to different privilege levels using translation lookaside buffer tags, according to one embodiment.

FIG. 6 depicts a flow diagram of a method for optimizing context switches between hypervisor components assigned to different privilege levels using translation lookaside buffer tags, according to one embodiment. For explanatory purposes only, the context of FIG. 6 is that hardware platform 102 supports multiple virtual address spaces that are translated differently depending on the privilege level 210.

Tagged translation lookaside buffer entries 510 enable distinct EL0/EL1 address spaces 560 within tagged EL0/EL1 address space 550. However, hardware platform 102 does not support a tagged address space at EL2. More specifically, upon receiving a translation request that is initiated at EL2, hardware-based TLB lookup operations ignore VMIDs 522 and ASIDs 524 included in tags 520. Despite the insignificance of tags 520 during TLB lookup operations initiated at EL2, this method leverages tags 520 to reduce TLB flushes that are required to preserve the integrity of the EL2 address space.

The method begins at step 601 where hypervisor kernel 190 is executing in hypervisor kernel context 352 and operating in tagged EL0/EL1 address space 550. Notably, hypervisor kernel 190 and VMMs 140 are each assigned a separate VMID 522. Further, in some embodiments, each process that executes in hypervisor kernel 190 is assigned a separate ASID 524. Among other things, hypervisor kernel 190 may be executing an operating system function at EL1 or executing a scheduled user world 130 at EL0. While hypervisor kernel 190 is controlling execution flow, hypervisor kernel 190 elects to switch execution to a particular VMM 140 and, consequently, commences a context switch to VMM context 372. The scheduler within hypervisor kernel 190 may determine to switch execution for any number of reasons, such as requests from user worlds 130, requests from VMMs 140, or a resource sharing heuristic.

As part of initiating the context switch (step 603), hypervisor kernel 190 compares VMID 522 of VMM 140 to VMID 522 of the most recently executed VMM 140 (i.e., the last VMM 140 that ran on CPU 103). At step 605, if hypervisor kernel 190 determines that VMID 522 of VMM 140 is equal to VMID 522 of the most recently executed VMM 140, then this method proceeds to step 607. At step 607, hypervisor kernel 190 sets a "TLBFlush" hypercall argument to false, thereby indicating that invalidating the TLB entries is unnecessary. This method then proceeds to step 611.

If, at step 605, hypervisor kernel 190 determines that VMID 522 of VMM 140 is not equal to VMID 522 of the most recently executed VMM 140, then this method proceeds to step 609. At step 609, hypervisor kernel 190 sets a "TLBFlush" hypercall argument to true, thereby indicating that invalidating the EL2 TLB entries is necessary to maintain the integrity of the untagged EL2 address space.

At step 611, hypervisor kernel 190 issues a hypercall configured to perform a context switch from hypervisor kernel context 352 to VMM context 372. The hypercall causes execution to exit EL1 and enter EL2 via the trampoline scheme outlined in conjunction with FIG. 4. More specifically, at step 613, trampoline code 312 executes at EL2, handling the hypercall. If, at step 615, trampoline code 312 detects that "TLBFlush" hypercall argument is true, then trampoline code 312 coordinates with selected VMM 140 to flush the EL2 entries in the TLB (step 617). This method then proceeds to step 619.

If, at step 615, trampoline code 312 detects that "TLBFlush" hypercall argument is false, then the entries in the TLB are not altered. In this fashion, hypervisor kernel 190 enables trampoline code 312 to avoid unnecessary TLB flushes at EL2 despite the lack of support provided by hardware platform 102 for tags 520 at EL2. This method then proceeds to step 619.

At step 619, VMM 140 deactivates trampoline code 312, saves appropriate EL0-EL2 state, and assumes execution control at EL2. VMM 140 executes VM 120 at EL2, guest OS 132 at EL1, and applications 113 at EL0 until VMM 140 receives a request, such as an interrupt, to return execution control flow to hypervisor kernel 190. This method then terminates.

To further increase the speed of context switches and potentially implement lazy context switches, both hypervisor kernel 190 and VMMs 140 execute at EL2. Such an embodiment provides mechanisms to handle exceptions from user worlds 130 executing at EL0 to hypervisor kernel 190 and VMMs 140.

Figure 7:
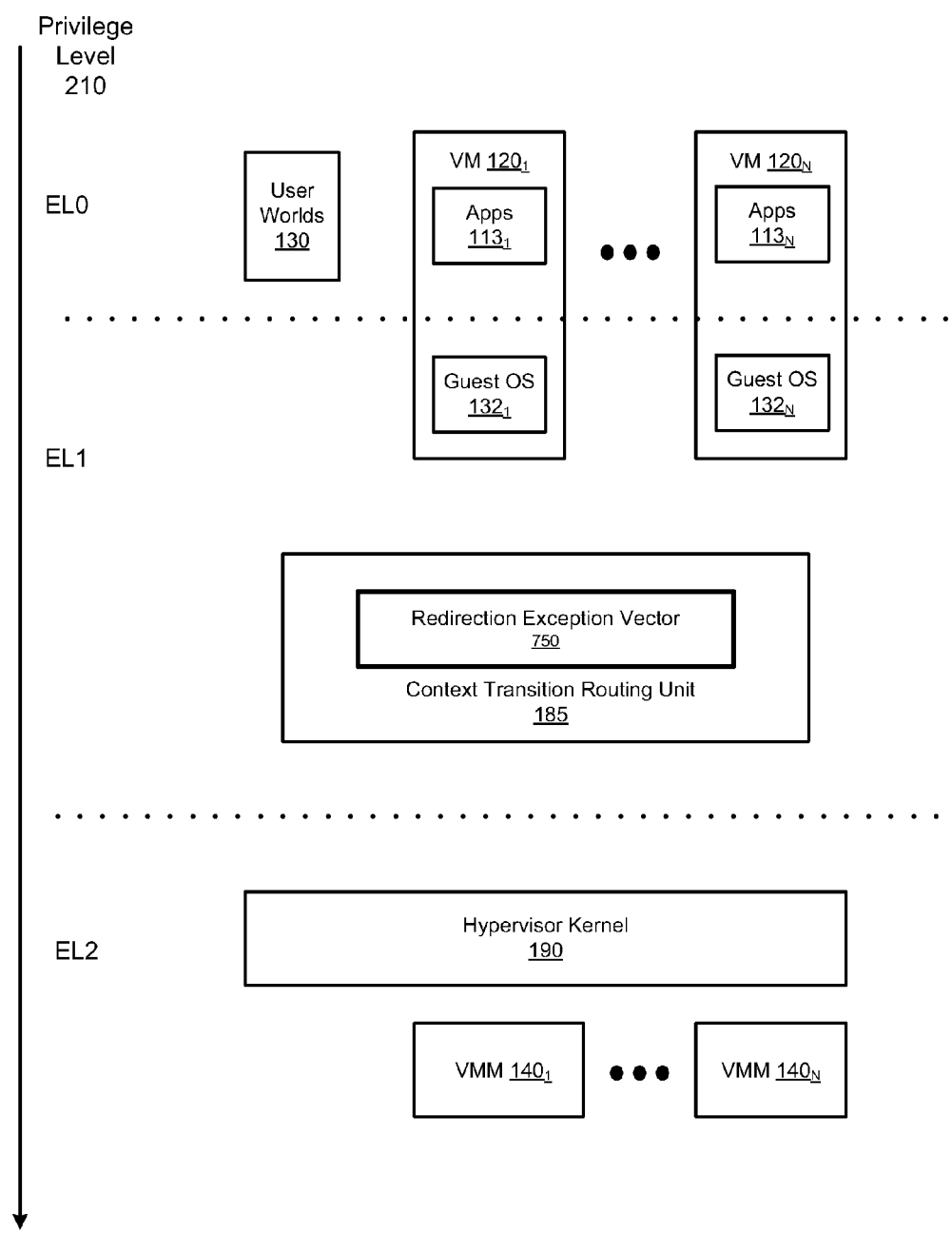
FIG. 7 is a conceptual diagram that illustrates a redirection exception vector employed to bypass an intermediate privilege level during the handling of an exception from user world to hypervisor kernel and virtual machine monitor, according to one embodiment.

FIG. 7 is a conceptual diagram that illustrates a redirection exception vector 750 employed to bypass an intermediate privilege level 210 during the handling of an exception from user world 130 to hypervisor kernel 190 and virtual machine monitor (VMM) 140, according to one embodiment. As shown, processes within user worlds 130 and applications 113 within VMs 120 execute at EL0; guest operating systems 132 execute at EL1; and hypervisor kernel 190 and VMMs 140 execute at EL2. It is noted that, because hypervisor kernel 190 executes at EL2, hypervisor kernel 190 may directly access EL2 state to perform "lazy switching"—deferring some save/restore state operations until specific registers are accessed or a particular VMM 140 or user world 130 is scheduled that is unrelated to the currently active user world 130 or VMM 140.

To handle exceptions from user worlds 130 executing at EL0 to hypervisor kernel 190 executing at EL2, context transition routing unit 185 operates at EL1. As shown, context transition routing unit 185 includes redirection exception vector 750. Redirection exception vector 750 is configured to respond to an EL0 exit with a "bounce" to EL2—exiting EL1 via a hypercall. In one approach to installing redirection exception vector 750, early hypervisor boot stages set or hypervisor 114 sets EL1 entries included in the exception vector table to this hypercall. Advantageously, unlike the conventional EL1 bypass mechanism (i.e., a Hypervisor Configuration Register bit) provided by hardware platform 102, effectively bypassing EL1 based on redirection exception vector 750 does not preclude certain optimizations such as hardware-assisted EL0/EL1 nested page tables.

Figure 8:
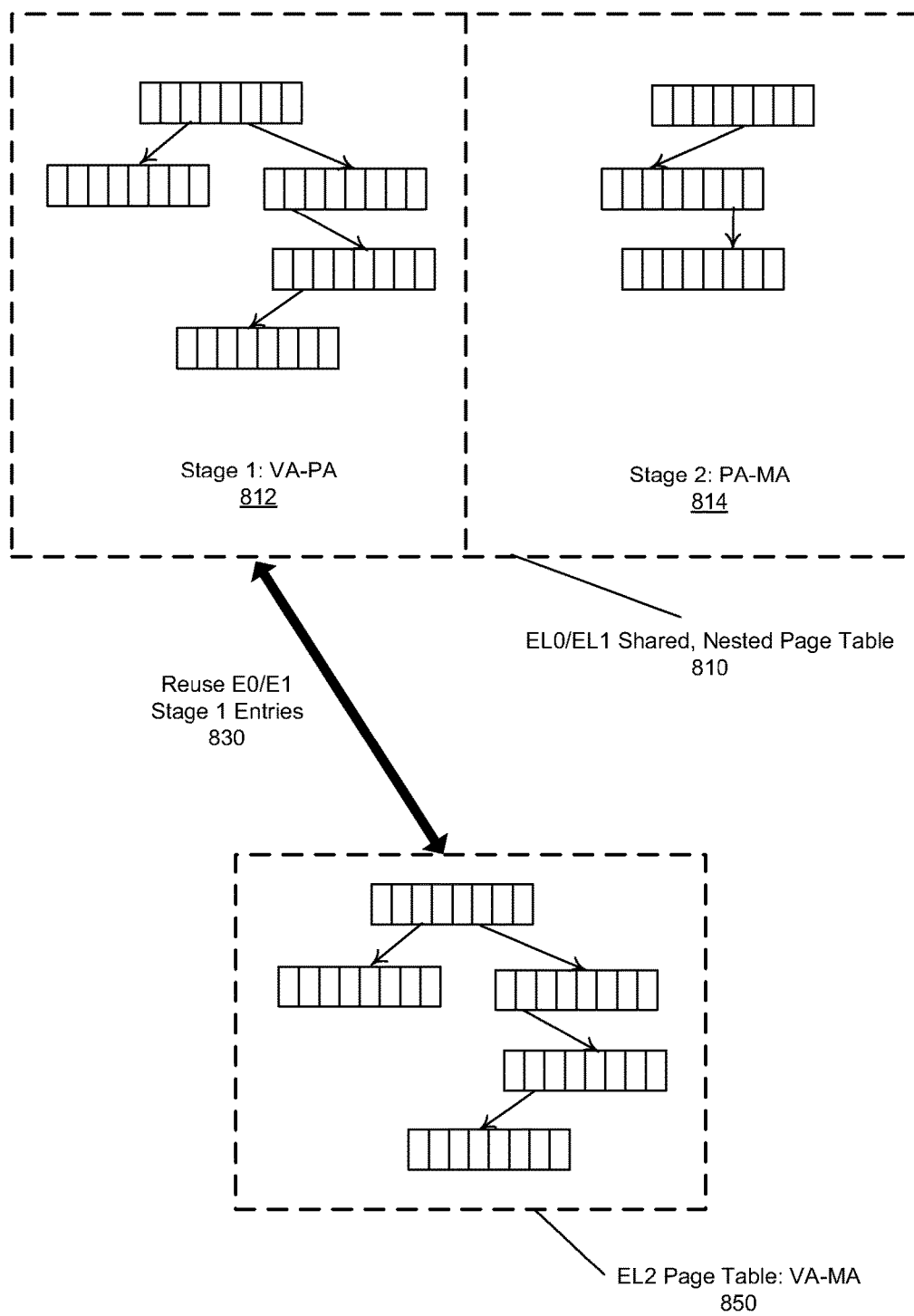
FIG. 8 is a conceptual diagram that illustrates reuse of stage 1 page table entries across privilege levels, according to one embodiment.

FIG. 8 is a conceptual diagram that illustrates reuse of stage 1 page table entries across privilege levels 210, according to one embodiment. Hardware platform 102 supports two sets of page tables: EL0/EL1 shared page tables and EL2 page tables. As shown, an EL0/EL1 shared, nested page table 810 includes a stage 1: guest virtual address (VA) to guest physical address (PA) 812 and a stage 2: PA to machine address (MA) 814. By contrast, in an EL2 page table: hypervisor virtual address (VA) to machine address (MA) 850 is part of a single stage translation scheme.

The page table entry format for stage 1: VA to PA 812 included in EL0/EL1 shared, nested page table 810 is similar to the page table entry format for EL2 page table: VA to MA 850. Advantageously, in some embodiments, when both hypervisor kernel 190 and VMMs 140 are assigned to EL2, hypervisor kernel 190 is configured to reuse EL0/EL1 stage 1 entries 830—sharing a subset of EL2 page tables for hypervisor kernel 190 with EL0/EL1 page tables for user worlds 130. When user worlds 130 execute, the second stage of translation, PA to MA, is disabled and hence idempotent.

Figure 9:
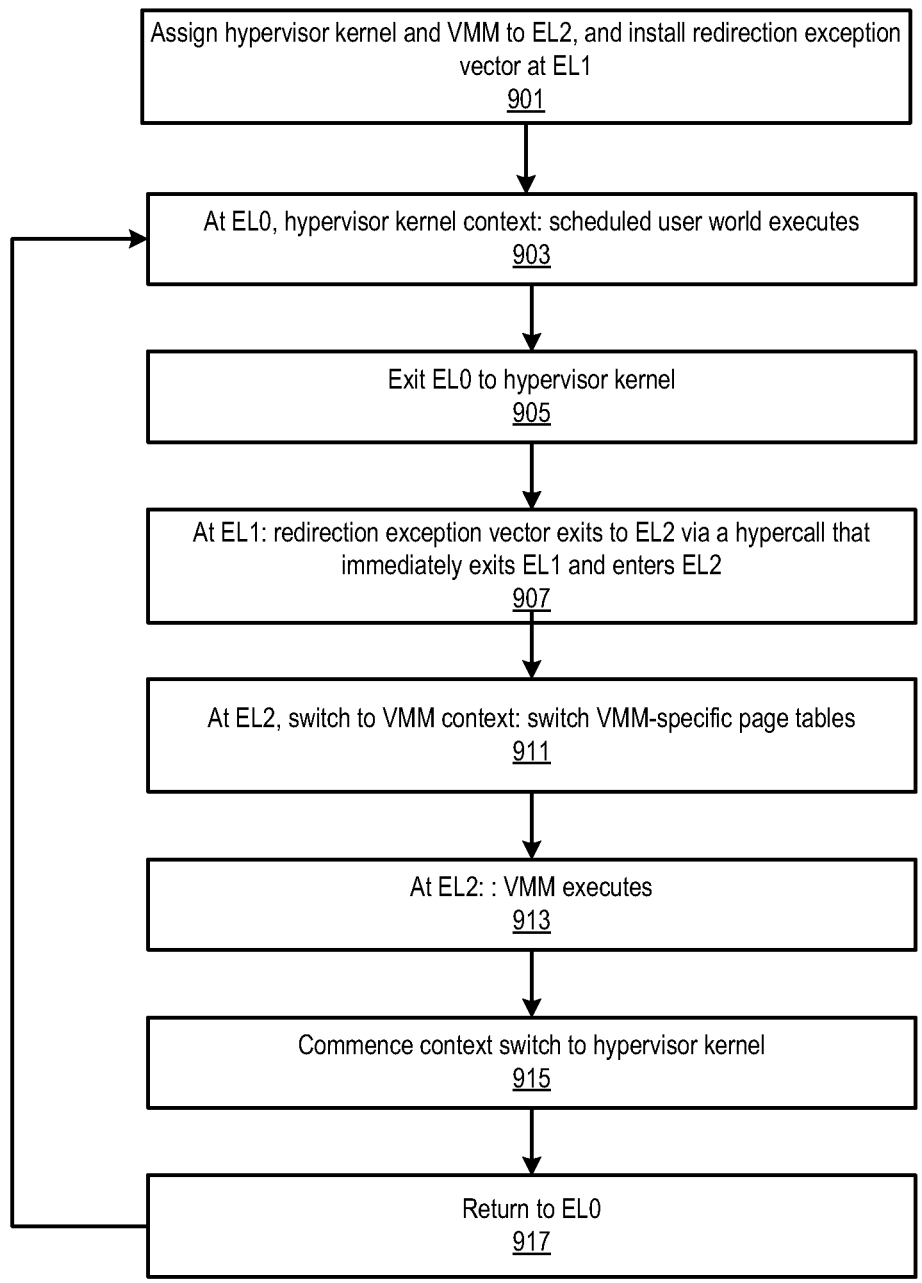
FIG. 9 depicts a flow diagram of a method that bypasses an intermediate privilege level while taking an exception from a lower privilege level to a higher privilege level, according to one embodiment.

FIG. 9 depicts a flow diagram of a method that bypasses an intermediate privilege level while taking an exception from a lower privilege level to a higher privilege level, according to one embodiment. As shown, this method begins at step 901, where CPU 103 starts (i.e., boots, initiates after reset, powers-up, etc.), and early hypervisor boot stages install and configure components included in hypervisor 114. Early hypervisor boot stages and the installation of components included in hypervisor 114 may be implemented in any technically feasible fashion.

As part of step 901, early hypervisor boot stages assign VMMs 140 and hypervisor kernel 190 to EL2 and installs redirection exception vector 750 at EL1. As disclosed previously herein, redirection exception vector 750 is configured to respond to an EL0 exit with a "bounce" to EL2—exiting EL1 via a hypercall. In one approach to installing redirection exception vector 750, early hypervisor boot stages or hypervisor 114 sets EL1 entries included in the exception vector table to this hypercall.

At step 903, hypervisor kernel 190 operates in a hypervisor kernel context—executing at EL2 and scheduling user worlds 130 to execute at EL0. In general, hypervisor kernel 190 may provide a variety of operating system functionality (e.g. resource scheduling, managing device drivers, etc.). Notably, hypervisor kernel 190 does not schedule other components of hypervisor 114 to execute at EL1.

At step 905, execution exits EL0 to hypervisor kernel 190. This exit may be in response to a variety of events, such as an interrupt or a system call instruction issued by user world 130. At step 907, execution enters EL1 and, based on redirection exception vector 750, immediately exits EL1 and then enters EL2 (step 911). Notably, only the instruction specified by redirection exception vector 750 is executed at EL1 as part of the exit to hypervisor kernel 190. After execution enters EL2, hypervisor kernel 190 elects to switch execution to VMM 140 and, consequently, commences a context switch to a VMM context. Hypervisor kernel 190 updates the EL2 page tables to reflect VMM 140 instead of the last executed VMM 140. For instance, hypervisor kernel 190 may update the page tables to reflect VMM $140_5$ instead of VMM $140_9$. Advantageously, hypervisor kernel 190 only invalidates EL2 TLB entries when switching to a different VMM 140. Consequently, the extent of translation lookaside buffer flushes is reduced compared to context switching techniques that do not share EL2 translation lookaside buffer entries between hypervisor kernel 190 and VMM 140.

Hypervisor kernel 190 and VMM 140 collaborate to perform additional context switching operations required to compete the context switch to VMM 140. In various embodiments, the remaining context switching operations, such as storing a snapshot of relevant EL0-EL2 state, may be partitioned in any technically feasible fashion between hypervisor kernel 190 and scheduled VMM 140. At step 913, VMM 140 runs at EL2—executing VM 120 at EL2, guest OS 132 at EL1, and applications 113 at EL0 until VMM 140 receives a request, such as an interrupt, to return execution control flow to hypervisor kernel 190 (step 915).

At step 915, VMM 140 and hypervisor kernel 190 update the EL0-EL2 state to reflect the snapshot of the EL0-EL2 state stored before VMM 140 assumed execution control flow. At step 917, hypervisor kernel 190 elects to return execution flow to user worlds 130 executing at EL0. This method then returns to step 903, where hypervisor kernel 190 schedules user worlds 130 to execute at EL0. Hypervisor 114 continues to execute steps 903-917, switching execution control between hypervisor kernel 190 and VMMs 140 and leveraging opportunities to reuse page tables and reduce TLB flushes.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of executing a context switch between hypervisor components in a computer system operable in more than two hierarchical privilege levels, comprising: assigning a first component and a second component of a hypervisor to a first privilege level; setting one or more entries in an exception vector table to install a redirection exception vector at a second privilege level that is less privileged than the first privilege level, the redirection exception vector configured to respond to an exit from a third privilege level, which is less privileged than the second privilege level, with a bounce to the first privilege level; causing the first component to run one or more commands at the third privilege level that is less privileged than the second privilege level; while the first component is running the one or more commands at the third privilege level, determining that a first context switch from the one or more commands running at the third privilege level to the first privilege level is to be performed and in response thereto, exiting the third privilege level and entering the second privilege level; in response to exiting the third privilege level, bouncing from the second privilege level to the first privilege level based on the redirection exception vector; configuring a state associated with the first privilege level; and executing the second component at the first privilege level.

2. The method of claim 1, wherein the first component is a hypervisor kernel and the second component is a virtual machine monitor.

3. The method of claim 1, wherein the redirection exception vector is a hypercall that is configured to exit the second privilege level to the first privilege level upon detecting an exit from the third privilege level.

4. The method of claim 3, wherein the hypercall is the only command that is executed at the second privilege level during the context switch.

5. The method of claim 1 wherein the state is unalterable by instructions executed at any privilege level lower than the first privilege level.

6. The method of claim 4, wherein configuring the state comprises at least one of setting an exception vector register and setting a translation table base register.

7. The method of claim 1, wherein the first context switch is determined to be performed based on one or more time-sharing heuristics.

8. The method of claim 1, wherein determining that the first context switch is to be performed comprises detecting one of a system call, an interrupt, an exception, a hypercall, or a fault.

9. The method of claim 1, further comprising flushing at least one entry of a translation lookaside buffer at the first privilege level prior to executing the second component.

10. The method of claim 1, wherein the first component and the second component share one or more translation lookaside buffer entries.

11. The method of claim 1, wherein the third privilege level and the second privilege level share a first set of page tables.

12. The method of claim 11, wherein the first set of page tables include first stage page tables and second stage page tables.

13. The method of claim 12, wherein the first component reuses a portion of the first stage page tables.

14. The method of claim 13, further comprising populating the first set of page tables to accommodate at least one user world and the first component without overlap.

15. The method of claim 1, further comprising: determining that a second context switch is to be performed and in response thereto, re-configuring the state and causing the first component to execute a third component at one of the third privilege level or the second privilege level.

16. A non-transitory computer-readable storage medium comprising instructions, which when executed in a computer system operable in more than two hierarchical privilege levels, causes the computer system to carry out the steps of: assigning a first component and a second component to a first privilege level; setting one or more entries in an exception vector table to install a redirection exception vector at a second privilege level that is less privileged than the first privilege level, the redirection exception vector configured to respond to an exit from a third privilege level, which is less privileged than the second privilege level, with a bounce to the first privilege level; causing the first component to run one or more commands at the third privilege level that is less privileged than the second privilege level; while the first component is running one or more commands at the third privilege level, determining that a first context switch from the one or more commands running at the third privilege level to the first privilege level is to be performed and in response thereto, exiting the third privilege level and entering the second privilege level in response to exiting the third privilege level, bouncing from the second privilege level to the first privilege level based on the redirection exception vector; configuring a state associated with the first privilege level; and executing the second component at the first privilege level.

17. The non-transitory computer-readable storage medium of claim 16, wherein the redirection exception vector is a hypercall that is configured to exit the second privilege level to the first privilege upon detecting an exit from the third privilege level.

18. The non-transitory computer-readable storage medium of claim 16, wherein the third privilege level and the second privilege level share a first set of page tables that include first stage page tables and second stage page tables.

19. A system of executing a context switch between hypervisor components in a computer system operable in more than two hierarchical privilege levels, comprising:

A memory and a processor configured to:

assign a first component and a second component of a hypervisor to a first privilege level;

set one or more entries in an exception vector table to install a redirection exception vector at a second privilege level that is less privileged than the first privilege level, the redirection exception vector configured to respond to an exit from a third privilege level, which is less privileged than the second privilege level, with a bounce to the first privilege level;

cause the first component to run one or more commands at the third privilege level that is less privileged than the second privilege level;

while the first component is running the one or more commands at the third privilege level, determine that a first context switch from the one or more commands running at the third privilege level to the first privilege level is to be performed and in response thereto, exiting the third privilege level and entering the second privilege level;

in response to exiting the third privilege level, bounce from the second privilege level to the first privilege level based on the redirection exception vector;

configure a state associated with the first privilege level; and execute the second component at the first privilege level.

* * * * *